US008005934B2

(12) United States Patent
Da Palma et al.

(10) Patent No.: US 8,005,934 B2
(45) Date of Patent: Aug. 23, 2011

(54) CHANNEL PRESENCE IN A COMPOSITE SERVICES ENABLEMENT ENVIRONMENT

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 11/297,061

(22) Filed: Dec. 8, 2005

(65) Prior Publication Data
US 2007/0136448 A1 Jun. 14, 2007

(51) Int. Cl.
*G06F 15/173* (2006.01)
(52) U.S. Cl. ........ 709/223; 709/200; 709/224; 709/227; 709/204; 709/205
(58) Field of Classification Search .................. 709/223, 709/224, 227, 204, 205
See application file for complete search history.

(56) References Cited

U.S. PATENT DOCUMENTS

| 5,278,943 | A | | 1/1994 | Gasper et al. | |
|---|---|---|---|---|---|
| 5,774,551 | A | | 6/1998 | Wu et al. | |
| 5,781,720 | A | * | 7/1998 | Parker et al. | 714/38 |
| 5,873,094 | A | | 2/1999 | Talatik | |
| 6,195,697 | B1 | * | 2/2001 | Bowman-Amuah | 709/224 |
| 6,269,336 | B1 | * | 7/2001 | Ladd et al. | 704/270 |
| 6,272,625 | B1 | | 8/2001 | DeCarmo | |
| 6,298,370 | B1 | | 10/2001 | Tang et al. | |

(Continued)

FOREIGN PATENT DOCUMENTS
CN 1697419 A 11/2005
(Continued)

OTHER PUBLICATIONS

Licciardi et al. Technologies and guidelines for service creation in NGN, 8th ITU International Conference on Intelligence in Networks 2003.*

(Continued)

*Primary Examiner* — John Follansbee
*Assistant Examiner* — Anthony Mejia
(74) *Attorney, Agent, or Firm* — Steven M. Greenberg, Esq.; Carey, Rodriquez, Greenberg & Paul

(57) ABSTRACT

Embodiments of the present invention provide a method, system and computer program product for deploying and delivering composite services in an NGN network. In one embodiment of the invention, a channel presence detection method for a composite services enablement environment can include establishing multiple channels of access to a common session for a composite service, synchronizing changes of state for a model for the common session in the views for the channels of access to the composite service, and periodically indicating in at least one of the views, a listing of the established channels of access. In one aspect of the invention, periodically indicating a listing of the established channels of access can include detecting an update to the model indicating a change in established channels of access to the common session. In response, a hidden view for an end point for an established channel of access to the common session can be provided with an updated listing of other established channels of access to the session. Consequently, the hidden view can provide the updated listing to a corresponding visible view in the end point.

10 Claims, 4 Drawing Sheets

U.S. PATENT DOCUMENTS

| | | | |
|---|---|---|---|
| 6,301,609 B1 * | 10/2001 | Aravamudan et al. | 709/207 |
| 6,317,794 B1 | 11/2001 | Papierniak et al. | |
| 6,339,754 B1 * | 1/2002 | Flanagan et al. | 704/2 |
| 6,351,271 B1 | 2/2002 | Mainwaring et al. | |
| 6,366,771 B1 | 4/2002 | Angle et al. | |
| 6,370,508 B2 | 4/2002 | Beck et al. | |
| 6,442,547 B1 * | 8/2002 | Bowman-Amuah | 707/10 |
| 6,523,035 B1 | 2/2003 | Fleming et al. | |
| 6,606,744 B1 * | 8/2003 | Mikurak | 717/174 |
| 6,611,867 B1 * | 8/2003 | Bowman-Amuah | 709/224 |
| 6,618,490 B1 | 9/2003 | Cham et al. | |
| 6,662,340 B2 | 12/2003 | Rawat et al. | |
| 6,724,403 B1 | 4/2004 | Santoro et al. | |
| 6,735,566 B1 | 5/2004 | Brand | |
| 6,757,362 B1 | 6/2004 | Cooper et al. | |
| 6,810,429 B1 | 10/2004 | Walsh et al. | |
| 6,910,074 B1 | 6/2005 | Amin et al. | |
| 7,000,019 B2 * | 2/2006 | Low et al. | 709/227 |
| 7,023,840 B2 * | 4/2006 | Golla et al. | 370/360 |
| 7,149,772 B1 * | 12/2006 | Kalavade | 709/203 |
| 7,177,881 B2 | 2/2007 | Schwesig et al. | |
| 7,203,907 B2 * | 4/2007 | Weng et al. | 715/748 |
| 7,210,098 B2 * | 4/2007 | Sibal et al. | 715/205 |
| 7,233,933 B2 * | 6/2007 | Horvitz et al. | 706/21 |
| 7,254,823 B2 * | 8/2007 | Knudson | 725/46 |
| 7,330,487 B2 | 2/2008 | Chang et al. | |
| 7,334,018 B2 * | 2/2008 | Elms | 709/205 |
| 7,336,628 B2 | 2/2008 | Chang et al. | |
| 7,337,405 B2 | 2/2008 | Weng et al. | |
| 7,356,567 B2 * | 4/2008 | Odell et al. | 709/206 |
| 7,525,937 B2 | 4/2009 | O'Neill | |
| 2001/0027474 A1 | 10/2001 | Nachman et al. | |
| 2001/0034738 A1 | 10/2001 | Cantwell et al. | |
| 2001/0052023 A1 | 12/2001 | Lin et al. | |
| 2002/0016736 A1 | 2/2002 | Cannon et al. | |
| 2002/0052932 A1 | 5/2002 | Curtis et al. | |
| 2002/0055350 A1 * | 5/2002 | Gupte et al. | 455/412 |
| 2002/0089539 A1 * | 7/2002 | Lindhorst et al. | 345/764 |
| 2002/0099602 A1 | 7/2002 | Moskowitz et al. | |
| 2002/0105909 A1 | 8/2002 | Flanagan et al. | |
| 2002/0140731 A1 | 10/2002 | Subramaniam et al. | |
| 2002/0154162 A1 | 10/2002 | Bhatia et al. | |
| 2002/0169613 A1 | 11/2002 | Damiba | |
| 2002/0184346 A1 | 12/2002 | Mani | |
| 2002/0184373 A1 | 12/2002 | Maes | |
| 2002/0184610 A1 | 12/2002 | Chong et al. | |
| 2002/0187750 A1 | 12/2002 | Majumdar | |
| 2002/0194388 A1 * | 12/2002 | Boloker et al. | 709/310 |
| 2003/0023953 A1 | 1/2003 | Lucassen et al. | |
| 2003/0026269 A1 | 2/2003 | Paryani | |
| 2003/0040995 A1 | 2/2003 | Daddario et al. | |
| 2003/0046088 A1 | 3/2003 | Yuschik | |
| 2003/0055884 A1 | 3/2003 | Yuen et al. | |
| 2003/0088421 A1 | 5/2003 | Maes et al. | |
| 2003/0095540 A1 | 5/2003 | Mulligan et al. | |
| 2003/0108063 A1 | 6/2003 | Joseph et al. | |
| 2003/0110297 A1 | 6/2003 | Tabatabal et al. | |
| 2003/0120813 A1 | 6/2003 | Majumdar et al. | |
| 2003/0182622 A1 | 9/2003 | Sibal et al. | |
| 2003/0204561 A1 | 10/2003 | Briscoe et al. | |
| 2003/0212762 A1 | 11/2003 | Barnes et al. | |
| 2003/0223381 A1 | 12/2003 | Schroderus | |
| 2004/0031058 A1 * | 2/2004 | Reisman | 725/112 |
| 2004/0039795 A1 * | 2/2004 | Percival | 709/218 |
| 2004/0078787 A1 | 4/2004 | Borek et al. | |
| 2004/0104938 A1 * | 6/2004 | Saraswat et al. | 345/764 |
| 2004/0128342 A1 * | 7/2004 | Maes et al. | 709/200 |
| 2004/0133888 A1 | 7/2004 | Ard et al. | |
| 2004/0172254 A1 | 9/2004 | Sharma et al. | |
| 2004/0172258 A1 | 9/2004 | Dominach et al. | |
| 2004/0181461 A1 | 9/2004 | Raiyani et al. | |
| 2004/0199529 A1 | 10/2004 | Clark et al. | |
| 2004/0199574 A1 | 10/2004 | Franco et al. | |
| 2004/0205614 A1 | 10/2004 | Keswa | |
| 2004/0215824 A1 | 10/2004 | Payrits | |
| 2004/0230466 A1 | 11/2004 | Davis et al. | |
| 2004/0250201 A1 * | 12/2004 | Caspi | 715/512 |
| 2004/0254957 A1 | 12/2004 | Hyotyniemi et al. | |
| 2004/0255030 A1 | 12/2004 | Sillanpaa | |
| 2005/0021826 A1 | 1/2005 | Kumar | |
| 2005/0027495 A1 | 2/2005 | Matichuk | |
| 2005/0060138 A1 | 3/2005 | Wang et al. | |
| 2005/0069225 A1 | 3/2005 | Schneider et al. | |
| 2005/0125541 A1 * | 6/2005 | Frank et al. | 709/227 |
| 2005/0129198 A1 * | 6/2005 | Sudhir et al. | 379/90.01 |
| 2005/0132023 A1 | 6/2005 | Cazzolla et al. | |
| 2005/0136897 A1 * | 6/2005 | Praveenkumar et al. | 455/414.1 |
| 2005/0147216 A1 | 7/2005 | Janakiraman et al. | |
| 2005/0152522 A1 | 7/2005 | Kumhyr | |
| 2005/0172331 A1 * | 8/2005 | Blackketter et al. | 725/135 |
| 2005/0198099 A1 | 9/2005 | Motsinger et al. | |
| 2005/0203944 A1 | 9/2005 | Dinh et al. | |
| 2005/0251393 A1 | 11/2005 | Georgescu | |
| 2005/0278444 A1 * | 12/2005 | Sims et al. | 709/224 |
| 2005/0283364 A1 | 12/2005 | Longe et al. | |
| 2006/0015600 A1 | 1/2006 | Piper | |
| 2006/0036770 A1 | 2/2006 | Hosn et al. | |
| 2006/0069563 A1 | 3/2006 | Ju et al. | |
| 2006/0074980 A1 | 4/2006 | Sarkar | |
| 2006/0168002 A1 | 7/2006 | Chesley | |
| 2006/0195584 A1 | 8/2006 | Baumann | |
| 2006/0200569 A1 | 9/2006 | Koch et al. | |
| 2006/0212511 A1 * | 9/2006 | Garcia-Martin | 709/203 |
| 2006/0282856 A1 * | 12/2006 | Errico et al. | 725/46 |
| 2006/0287866 A1 * | 12/2006 | Cross et al. | 704/275 |
| 2007/0005990 A1 * | 1/2007 | Sathish | 713/189 |
| 2007/0049281 A1 * | 3/2007 | Chen et al. | 455/445 |
| 2007/0081557 A1 | 4/2007 | Binetti et al. | |
| 2007/0100981 A1 | 5/2007 | Adamczyk et al. | |
| 2007/0124507 A1 * | 5/2007 | Gurram et al. | 710/1 |
| 2007/0180075 A1 | 8/2007 | Chasman et al. | |

FOREIGN PATENT DOCUMENTS

| | | |
|---|---|---|
| EP | 1199872 A2 | 4/2002 |
| EP | 1411704 A2 | 4/2004 |
| GB | 2389479 | 10/2003 |
| WO | 0005903 A2 | 2/2000 |
| WO | 0131472 | 5/2001 |
| WO | 0221300 A1 | 3/2002 |
| WO | 03056769 A1 | 7/2003 |
| WO | 03079144 A2 | 9/2003 |
| WO | 2004064321 A1 | 7/2004 |

OTHER PUBLICATIONS

Licciardi et al. Technologies and Guidelines for Service Creation in NGN, 8th ITU International COnference in Networks 2003.*

Georgescu, S., et al; Multimodal IMS Services: The Adaptive Keyword Spotting Interaction Paradigm; Autonomic & Autonomous Systems & Int'l Conference on Networking & Services; 2005; ICAS-ICNS 2005. Joint Int'l Conference on Papette, Tahiti, Oct. 23-28, 2005, Piscataway, NJ; IEEE, Oct. 23, 2005; pp. 1-6; XP010864688; ISSN: 0-7695-2450-8, p. 1-5.

Engelsma, J., et al; Distributed Multimodal Synchronization Protocol; IETF Standard-Working Draft, Internet Engineering Task Force, IETF, CH, Jul. 8, 2005, pp. 1-71, XP0105041593; ISSN; 0000-0004; pp. 3-8.

Bodell, M., et al; W3C Multimodal Interaction Citation, [Online] May 6, 2003, pp. 1-19, XP002305381; retrieved from the Internet: URL: www.w3.org/TR/mmi-framework/ [retrieved on Nov. 12, 2004] p. 2-18.

Keidl, Markus, et al; Flexible and Reliable Web Service Execution; (http://www-db.in.tum.de/research/publications/conferences/WebServices_Workshop.pdf).

* cited by examiner

CHANNEL PRESENCE IN A COMPOSITE SERVICES ENABLEMENT ENVIRONMENT

BACKGROUND OF THE INVENTION

1. Field of the Invention

The present invention relates to the field of next generation networking (NGN) and more particularly to the deployment and delivery of composite services over an NGN network.

2. Description of the Related Art

Next generation networking (NGN) refers to emerging computing networking technologies that natively support data, video and voice transmissions. In contrast to the circuit switched telephone networks of days gone by, NGN networks are packet switched and combine voice and data in a single network. Generally, NGN networks are categorized by a split between call control and transport. Also, in NGN networks, all information is transmitted via packets which can be labeled according to their respective type. Accordingly, individual packets are handled differently depending upon the type indicated by a corresponding label.

The IP Multimedia Subsystem (IMS) is an open, standardized, operator friendly, NGN multimedia architecture for mobile and fixed services. IMS is a Voice over Internet Protocol (VoIP) implementation based upon a variant of the session initiation protocol (SIP), and runs over the standard Internet protocol (IP). Telecom operators in NGN networks offer network controlled multimedia services through the utilization of IMS. The aim of IMS is to provide new services to users of an NGN network in addition to currently available services. This broad aim of IMS is supported through the extensive use of underlying IP compatible protocols and corresponding IP compatible interfaces. In this way, IMS can merge the Internet with the wireless, cellular space so as to provide to cellular technologies ubiquitous access useful services deployed on the Internet.

Multimedia services can be distributed both within NGN networks and non-NGN networks, alike, through the use of markup specified documents. In the case of a service having a visual interface, visually oriented markup such as the extensible hypertext markup language (XHTML) and its many co-species can specify the visual interface for a service when rendered in a visual content browser through a visual content channel, for instance a channel governed by the hypertext transfer protocol (HTFP). By comparison, an audio interface can be specified for a service by voice oriented markup such as the voice extensible markup language (VoiceXML). In the case of an audio interface, a separate voice channel, for instance a channel governed according to SIP.

In many circumstances, it is preferred to configure services to be delivered across multiple, different channels of differing modalities, including the voice mode and the visual mode. In this regard, a service provider not always can predict the interactive modality through which a service is to be accessed by a given end user. To accommodate this uncertainty, a service can be prepared for delivery through each anticipated modality, for instance by way of voice markup and visual markup. Generating multiple different markup documents to satisfy the different modalities of access, however, can be tedious. In consequence, merging technologies such as the XHTML+VoiceXML (X+V) have been utilized to simplify the development process.

Specifically, X+V represents one technical effort to produce a multimodal application development environment. In X+V, XHTML and VoiceXML can be mixed in a single document. The XHTML portion of the document can manage visual interactions with an end user, while the VoiceXML portion of the document can manage voice interactions with the end user. In X+V, command, control and content navigation can be enabled while simultaneously rendering multimodal content. In this regard, the X+V profile specifies how to compute grammars based upon the visual hyperlinks present in a page.

Processing X+V documents, however, requires the use of a proprietary browser in the client devices utilized by end users when accessing the content. Distributing multimedia services to a wide array of end user devices, including pervasive devices across NGN networks, can be difficult if one is to assume that all end user devices are proprietarily configured to handle X+V and other unifying technologies. Rather, at best, it can only be presumed that devices within an NGN network are equipped to process visual interactions within one, standard channel of communication, and voice interactions within a second, standard channel of communication.

Thus, despite the promise of X+V, to truly support multiple modalities of interaction with services distributed about an NGN or, even a non-NGN network, different channels of communications must be established for each different modality of access. Moreover, each service must be separately specified for each different modality. Finally, once a session has been established across one modality of access to a service, one is not able to change mid-session to a different modality of access to the same service within the same session. As a result, the interactions across different channels accommodating different modalities of interaction remain unsynchronized and separate. Consequently, end users cannot freely switch between modalities of access for services in an NGN network.

BRIEF SUMMARY OF THE INVENTION

Embodiments of the present invention address deficiencies of the art in respect to deploying and delivering a service to be accessed through different channels of access in an NGN network, and provide a novel and non-obvious method, system and apparatus for deploying and delivering composite services in an NGN network. As used herein, a composite service is a service deployed across an NGN network that has been enabled to be accessed through multiple, different modalities of access in correspondingly different channels while maintaining the synchronization of the state of the service between the different channels of access.

In a first embodiment of the invention, a channel presence detection method for a composite services enablement environment can include establishing multiple channels of access to a common session for a composite service, synchronizing changes of state for a model for the common session in the views for the channels of access to the composite service, and periodically indicating in at least one of the views, a listing of the established channels of access. In one aspect of the invention, periodically indicating a listing of the established channels of access can include detecting an update to the model indicating a change in established channels of access to the common session. In response, a hidden view for an end point for an established channel of access to the common session can be provided with an updated listing of other established channels of access to the session. Consequently, the hidden view can provide the updated listing to a corresponding visible view in the end point.

In another embodiment of the invention, a composite service enabling data processing system can include channel servlets enabled to establish multiple different channels of access to a common session for a composite service. The system also can include a location registry including a table of entries associating the different channels of access with the common session for the composite service. The system yet further can include a model servlet configured for coupling to a model for the common session, for modifying state data in the model for the single session, and to synchronize views for each of the different channels of access to the common session responsive to changes detected in the model. Finally, the system can include channel presence detection logic coupled to the model. The channel presence detection logic can include program code enabled to periodically indicate in at least one of the views, a listing of the established different channels of access to the common session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for delivering composite services in an NGN network. In accordance with an embodiment of the present invention, different channels of access to a service can be established for accessing a service through corresponding different modalities of access including voice and visual modes. Specifically, interactions with a service within a session can be provided across selected ones of the different channels, each channel corresponding to a different modality of access to the service. In the case of a voice modality and a visual modality, a separate markup document can be utilized in each selected channel according to the particular modality for that channel.

Importantly, each channel utilized for accessing a service within a session can be associated with each other channel accessing the service within the same session. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

In accordance with the present invention, presence awareness for established channels of access can be provided in one or more views for the respective channels of access. In particular, as channels of access are established for a common session, a listing of the established channels of access can be maintained in a model for the session such that changes to the listing can be detected and reflected within a user interface element in an interested one of the views. As a result, the interested one of the views can maintain an awareness of established channels of access to the session.

Figure 1:
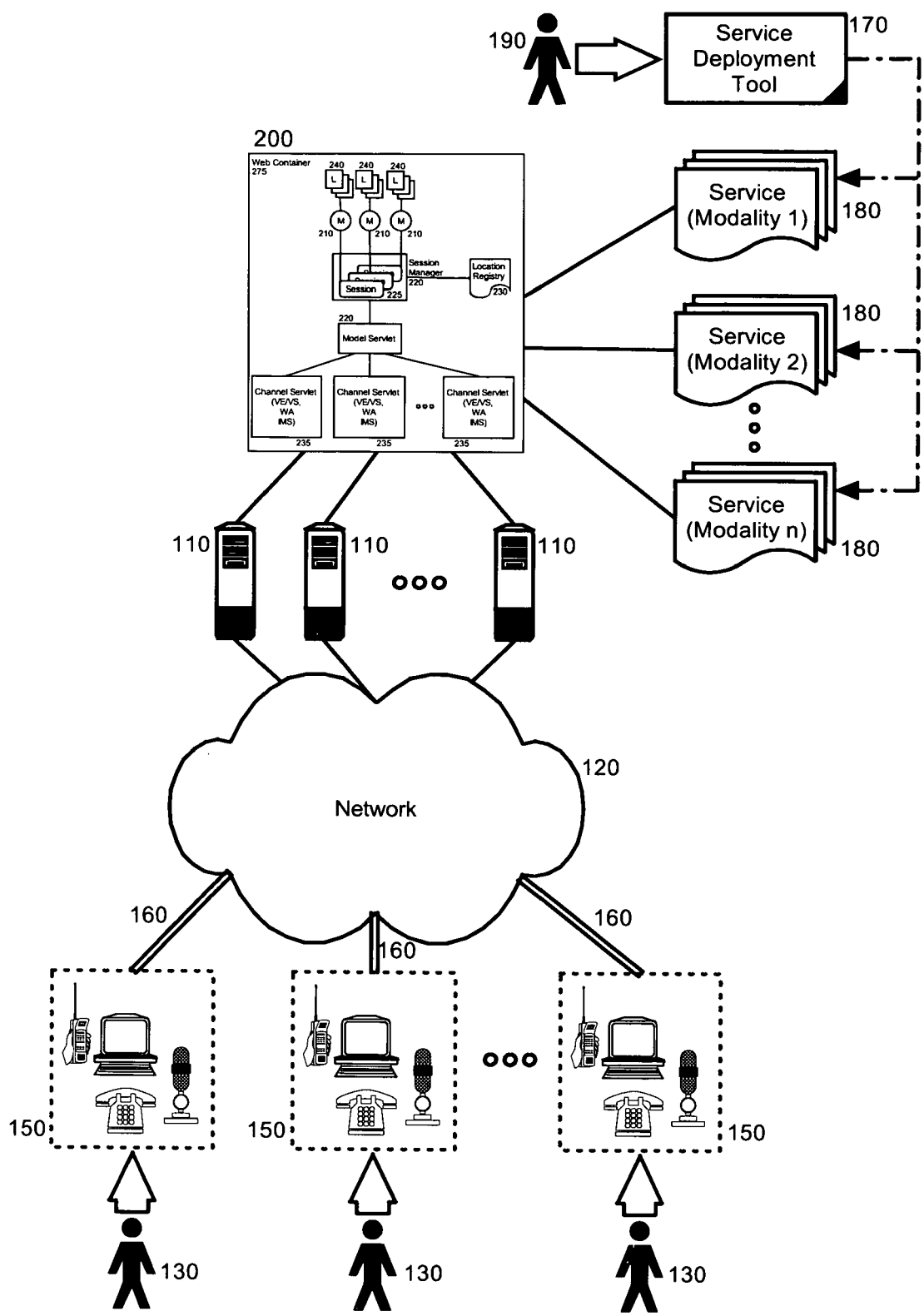
FIG. 1 is a pictorial illustration of an IMS configured for use with a data processing system arranged to deploy and deliver composite services in an NGN network.

Advantageously, the system of the present invention can be embodied within an IMS in a NGN network. In illustration, FIG. 1 is a pictorial illustration of an IMS configured for use with a data processing system enabled to establish a voice channel of access to a session for a composite service from a visual channel of access to the session in an NGN network. As shown in FIG. 1, a composite service enablement data processing system 200 can be arranged to deploy and deliver a composite multimedia service 180 in an NGN network 120. As used herein, a "composite multimedia service" can be a service configured to be accessed through multiple different views of different modalities across correspondingly different channels of communications.

More specifically, the composite multimedia service 180 can be accessed through several different modalities, including a visual mode, an instant messaging mode and a voice mode. Each modality of access can be produced by a developer 190 through the use of a service deployment tool 170. The service deployment tool 170 can be configured to produce the different modalities of access for the composite multimedia service 180, including visual markup to provide visual access to the composite multimedia service 180, and voice markup to provide audible access to the composite multimedia service 180.

One or more gateway server platforms 110 can be coupled to the composite service enablement data processing system 200. Each of gateway server platforms 110 can facilitate the establishment of a communication channel for accessing the composite multimedia service 180 according to a particular modality of access. For example, the gateway server platforms 110 can include a content server such as a Web server enabled to serve visual markup for accessing the composite multimedia service 180 over the NGN network 120 through a visual mode. Likewise, the gateway server platforms 110 can include a voice server enabled to provide audible access to the composite multimedia service 180 over the NGN network 120 through an audible mode.

End users 130 can access the composite multimedia service 180 utilizing any one of a selection of client access devices 150. Application logic within each of the client access devices 150 can provide an interface for a specific modality of access. Examples include a content browser within a personal computing device, an audible user interface within a pervasive device, a telephonic user interface within a telephone handset, and the like. Importantly, each of the provided modalities of access can utilize a separate one of multiple channels 160 established with a corresponding gateway server platform 110 over the network 120 for the same session with the composite multimedia service 180. In this regard, a session with the composite multimedia service 180 can subsist across the multiple channels 160 to provide different modalities of access to the composite multimedia service 180 for one of the end users 130.

Figure 2:
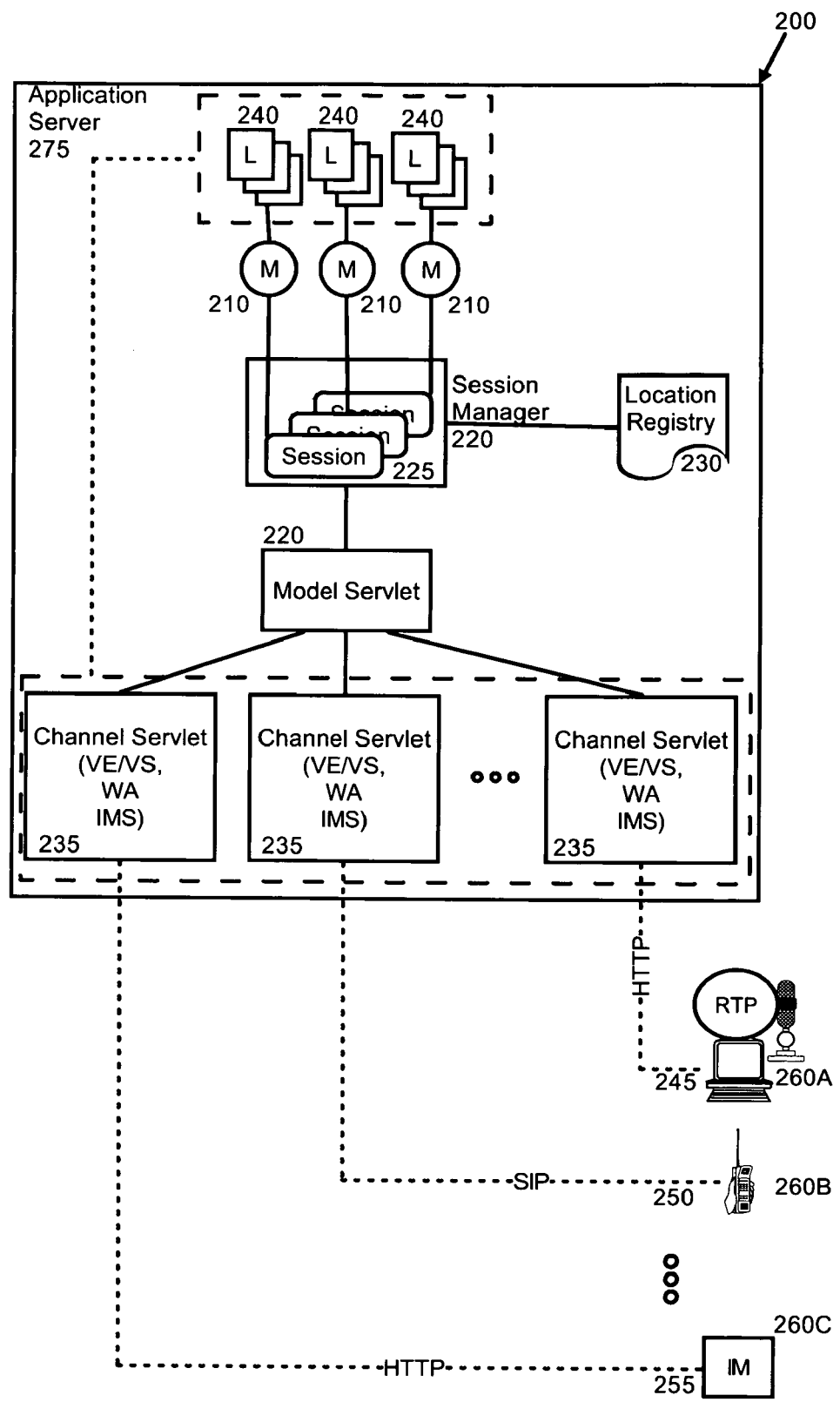
FIG. 2 is a schematic illustration of a data processing system arranged to deploy and deliver composite services in an NGN network.

In more particular illustration, FIG. 2 is a schematic illustration of the composite service enablement data processing system 200 of FIG. 1. The composite service enablement data processing system 200 can operate in an application server 275 and can include multiple channel servlets 235 configured to process communicative interactions with corresponding sessions 225 for a composite multimedia service over different channels of access 245, 250, 255 for different endpoint types 260A, 260B, 260C in an NGN network. In this regard, the channel servlets 235 can process voice interactions as a voice enabler and voice server to visual endpoint 260A incorporating a voice interface utilizing the Real Time Protocol (RTP) over HTTP, or a voice endpoint 260B utilizing SIP. Likewise, the channel servlets 235 can process visual interactions as a Web application to a visual endpoint 160A. As yet another example, the channel servlets 235 can process instant message interactions as an instant messaging server to an instant messaging endpoint 260C.

More specifically, the channel servlets 235 can be enabled to process HTTP requests for interactions with a corresponding session 225 for a composite multimedia service. The HTTP requests can originate from a visual mode oriented Web page over a visual channel 245, from a visual mode oriented instant messaging interface over an instant messaging channel 255, or even in a voice mode over a voice channel 250 enabled by SIP. Similarly, the channel servlets 235 can be enabled to process SIP requests for interactions with a corresponding session 225 for a composite multimedia service through a voice enabler which can include suitable voice markup, such as VoiceXML and call control extensible markup language (CCXML) coupled to a SIPlet which, in combination, can be effective in processing voice interactions for the corresponding session 225 for the composite multimedia service, as it is known in the art.

Each of the channel servlets 235 can be coupled to a model servlet 220. The model servlet 220 can mediate interactions with a model 210 for an associated one of the sessions 225. Each of the sessions 225 can be managed within a session manager 220 which can correlate different channels of communication established through the channel servlets 235 with a single corresponding one of the sessions 225. The correlation of the different channels of communication can be facilitated through the use of a coupled location registry 230. The location registry 230 can include a table indicating a host name of systems and channels active for the corresponding one of the sessions 225.

The model servlet 215 can include program code enabled to access a model 210 for a corresponding session 225 for a composite multimedia service providing different channels of access 245. 250, 255 through different endpoints 260A, 260B, 260C. For instance, the model 210 can be encapsulated within an entity bean within a bean container. Moreover, the model 210 can store session data for a corresponding one of the sessions 225 irrespective of the channel of access 245, 250, 255 through which the session data for the corresponding one of the sessions 225 is created, removed or modified.

Notably, changes in state for each of the sessions 225 for a composite multimedia service can be synchronized across the different views 260 for the different channels of access 245, 250, 255 through a listener architecture. The listener architecture can include one or more listeners 240 for each model 210. Each listener can correspond to a different channel of access 245, 250, 255 and can detect changes in state for the model 210. Responsive to detecting changes in state for the model 210 for a corresponding one of the sessions 225 for a composite multimedia service, a listener 240 can provide a notification to subscribing view 260 through a corresponding one of the channel servlets 235 so as to permit the subscribing views 260 to refresh to incorporate the detected changes in state for the model 210.

Figure 3:
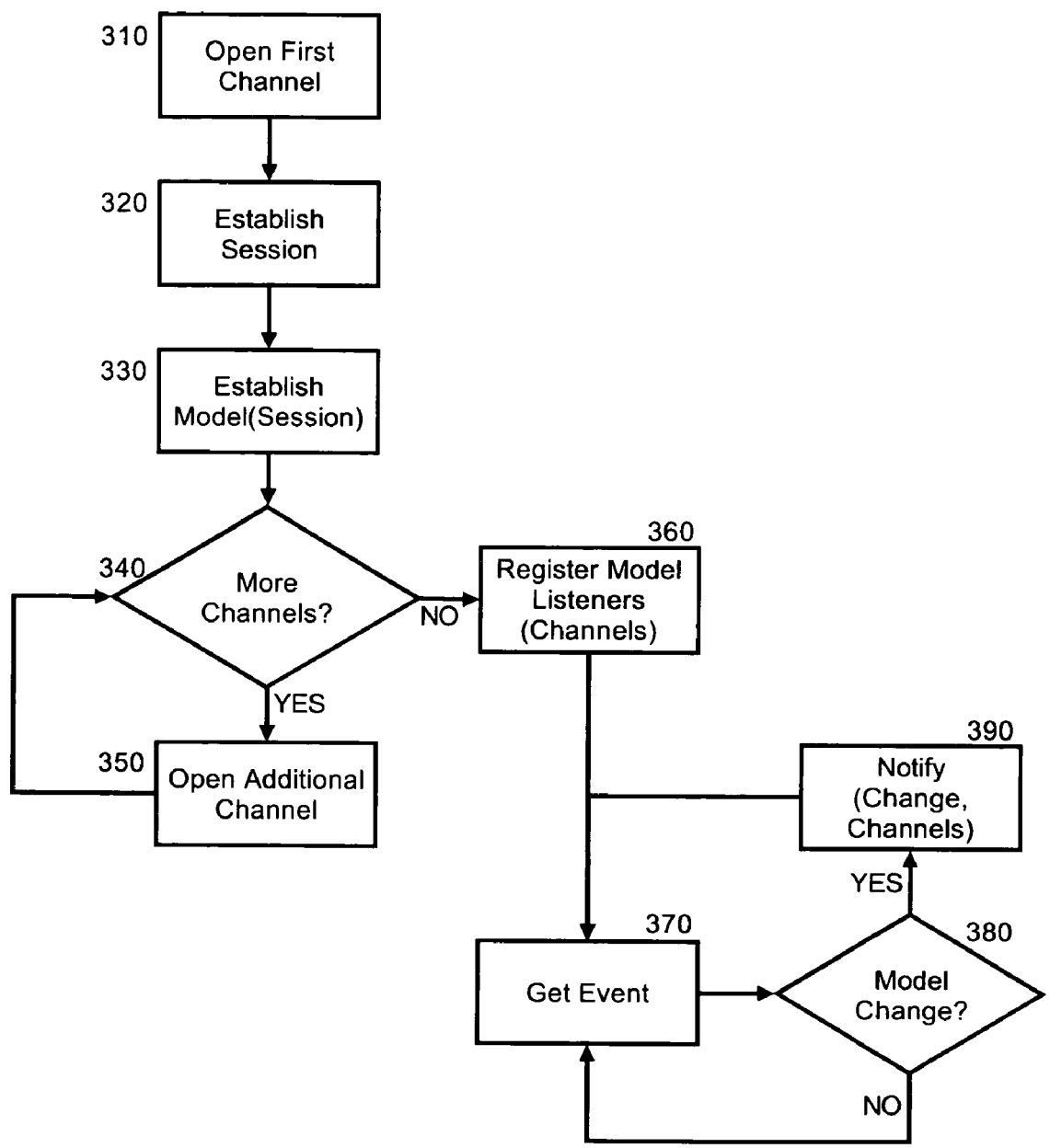
FIG. 3 is a flow chart illustrating a process for delivering composite services in an NGN network.

FIG. 3 is a flow chart illustrating a process for managing multiple channels of access to a single session for a composite service in the data processing system of FIG. 2. Beginning in block 310, a first channel of access can be opened for the composite multimedia service and a session can be established in block 320 with the composite multimedia service. Data for the session can be stored in a model for the session which can be established in block 330. If additional channels of access are to be established for the session in decision block 340, the process can continue in block 350. In block 350, an additional channel of access can be established for the same session for as many additional channels as required.

When no further channels of access are to be established in decision block 340, in block 360 a listener can be registered for each established channel of access for the session. Subsequently, in block 370 events can be received in each listener. In decision block 380, when a model change is detected, in block 390, the model change can be provided to each endpoint for selected ones of the established channels of access. In consequence, the endpoints can receive and apply the changes to corresponding views for the selected ones of the established channels of access for the same session, irrespective of the particular channel of access through which the changes to the model had been applied.

Figure 4:
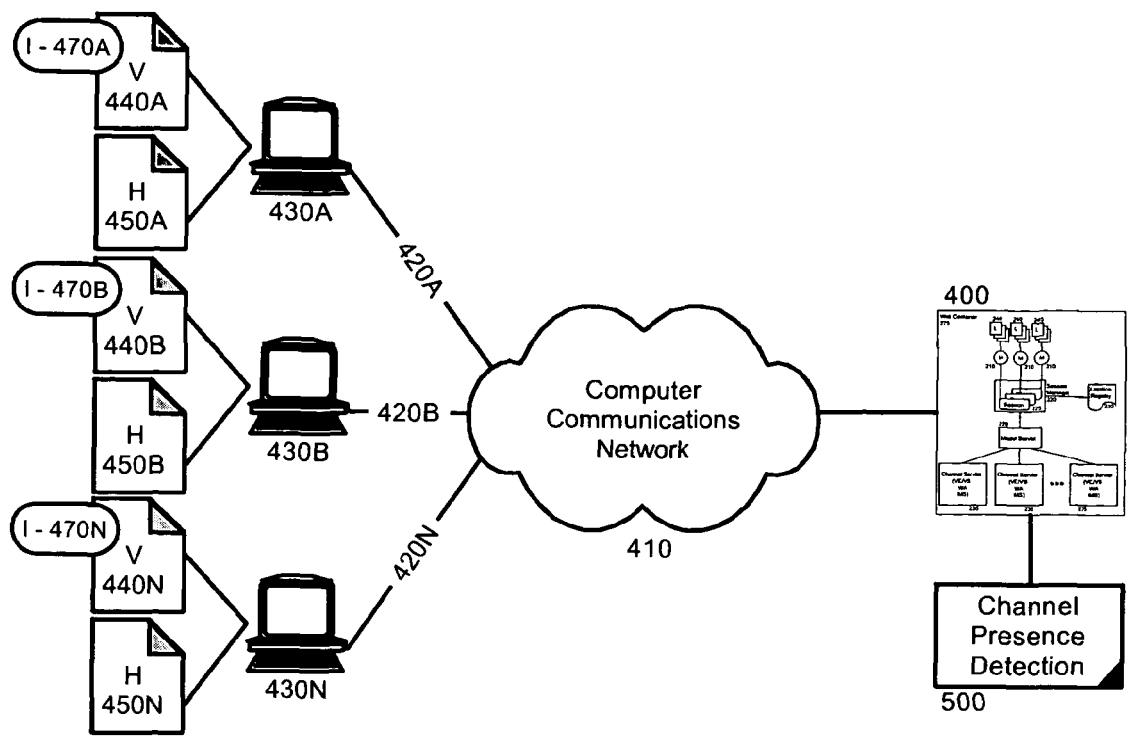
FIG. 4 is a schematic illustration of a composite services enablement environment configured for presence awareness; and, FIG. 5 is a flow chart illustrating a process for presence awareness in the composite services enablement environment of FIG. 4.

Notably, the listener architecture can be leveraged to provide presence awareness for established channels of access in one or more views for the respective channels of access. In illustration, FIG. 4 is a schematic illustration of a composite services enablement environment configured for presence awareness. As shown in FIG. 4, a composite services enablement data processing system 400 can be communicatively coupled to one or more end points 430A, 430B, 430N over a computer communications network. Each end point 430A, 430B, 430N can interact with a common session in the composite services enablement data processing system 400 over a separate channel of access 420A, 420B, 420N established for the session.

Each end point 430A, 430B, 430N can include a visible view 440A to the session reflecting the data in the model for the session in the composite services enablement data processing system 400. Moreover, each end point 430A, 430B, 430N can include a hidden view 450A, 450B, 450N coupled to the visible view 440A, 440B, 440N. The hidden view 450A, 450B, 450N periodically can refresh itself to capture changes in the model for the common session. As changes in the model are detected resulting in a change in the hidden view 450A, 450B, 450N, a script disposed in the hidden view 450A, 450B, 450N can apply the changed portions of the hidden view 450A, 450B, 450N to appropriate user interface portions of the visible view 440A, 440B, 440N so as to avoid the periodic, noticeable refreshing of the visible view 440A, 440B, 440N.

Importantly, channel presence detection logic 500 can be coupled to the listeners for the model for the common session in the composite services enablement data processing system 400. The channel presence detection logic 500 can include program code enabled to detect a change in the set of established channels of access 420A, 420B, 420N including the removal and addition channels of access 420A, 420B, 420N to the common session. Upon detecting a change in the set of established channels of access 420A, 420B, 420N, selected ones of the hidden views 450A, 450B, 450N can be notified of the change. Script logic within the selected ones of the hidden views 450A, 450B, 450N subsequently can place a user interface indicator 470A, 470B, 470N within respective ones of the visible views 440A, 440B, 440N so as to visually indicate the channels of access 420A, 420B, 420N present for the common session.

Figure 5:
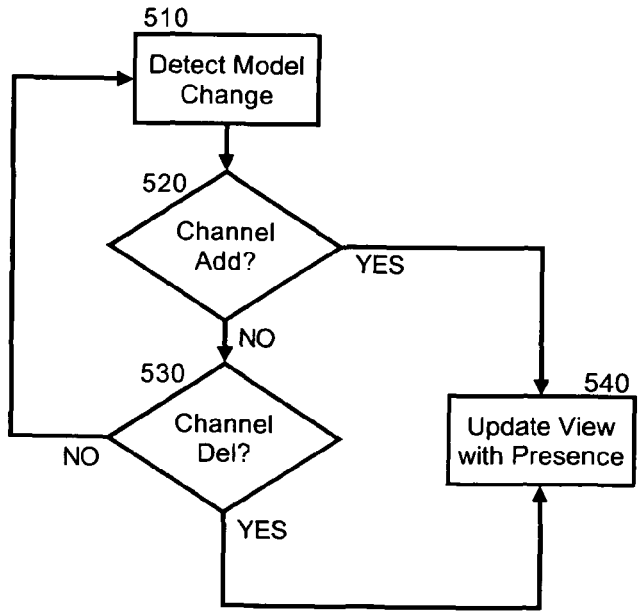

In further illustration, FIG. 5 is a flow chart illustrating a process for presence awareness in the composite services enablement environment of FIG. 4. Beginning in block 510, a model change can be detected for a model for a common session in the composite services enablement environment. Responsive to the detection of a model change, in decision block 520 it can be determined whether a new channel of access has been established for the common session. If so, in block 540, a registered view can be updated to reflect the additional presence of the new channel of access. Otherwise, in decision block 530, it can be determined whether an existing channel of access has been removed. If so, as before, in block 540 a registered view can be updated to reflect the absence of the removed channel of access.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A channel presence detection method for a composite services enablement environment, the method comprising: establishing multiple channels of access to a common session for a composite service, the channels comprising at least a voice channel of access to the common session and a visual channel of access to the common session;
synchronizing changes of state for a model for the common session in the views for the channels of access to the composite service; and,
periodically indicating in at least one of the views, a listing of the established channels of access, wherein periodically indicating in at least one of the views, a listing of the established channels of access, comprises:
detecting an update to the model indicating a change in established channels of access to the common session; and
responsive to the detection, providing a hidden view coupled to a visual view for an end point for an established channel of access to the common session with an updated listing of other established channels of access to the session, the hidden view providing the updated listing to a corresponding visible view in the end point;
capturing changes in the model for the common session; and
seamlessly applying the changes to user interface portions of the view of the visual channel of access.

2. The method of claim 1, wherein establishing multiple channels of access to a common session for a composite service, comprises establishing for a common session in a next generation networking (NGN) network at least a voice channel of access to the common session, and a visual channel of access to the common session.

3. The method of claim 1, wherein synchronizing changes of state for a model for the common session in the views for the channels of access to the composite service, comprises:
maintaining the state for the model for the common session;
creating listeners for changes of the state for the model;
detecting changes in the state for the model in the listeners; and,
updating the views for the channels of access to the common session responsive to detecting the changes of state for the model in the listeners.

4. A composite service enabling data processing system comprising:
an application server in the data processing system for storing and executing program code including at least one processor coupled to memory elements through a system bus;
a plurality of channel servlets executing in the application server and enabled to establish multiple different channels of access to a common session for a composite service, the channels comprising at least a voice channel of access to the common session and a visual channel of access to the common session;
a location registry coupled to the application server comprising a table of entries associating the different channels of access with the common session for the composite service;
a model servlet executing in the application server and configured for coupling to a model for the common session, for modifying state data in the model for the single session, and to synchronize views for each of the different channels of access to the common session responsive to changes detected in the model; and,
channel presence detection logic coupled to the model, the channel presence detection logic comprising program code enabled to periodically indicate in at least one of the views, a listing of the established different channels of access to the common session, wherein periodically indicating in at least one of the views, a listing of the established channels of access, comprises:

detecting an update to the model indicating a change in established channels of access to the common session; and responsive to the detection, providing a hidden view coupled to a visual view for an end point for an established channel of access to the common session with an updated listing of other established channels of access to the session, the hidden view providing the updated listing to a corresponding visible view in the end point;

capturing changes in the model for the common session; and seamlessly applying the changes to user interface portions of the view of the visual channel of access.

5. The system of claim 4, wherein the channel servlets comprise a voice enabler and voice server enabled to establish for the single session.

6. The system of claim 4, wherein the channel servlets and model servlet are disposed in a Web container.

7. The system of claim 4, wherein the channel servlets and model servlet are disposed in an Internet protocol (IP) multimedia subsystem (IMS) in a next generation networking (NGN) network.

8. A computer program product comprising a non-transitory medium having computer usable program code for channel presence detection for a composite services enablement environment, the computer program product including:

computer usable program code for establishing multiple channels of access to a common session for a composite service, the channels comprising at least a voice channel of access to the common session and a visual channel of access to the common session;

computer usable program code for synchronizing changes of state for a model for the common session in the views for the channels of access to the composite service; and, computer usable program code for periodically indicating in at least one of the views, a listing of the established channels of access, wherein periodically indicating in at least one of the views, a listing of the established channels of access, comprises:

detecting an update to the model indicating a change in established channels of access to the common session; and responsive to the detection, providing a hidden view coupled to a visual view for an end point for an established channel of access to the common session with an updated listing of other established channels of access to the session, the hidden view providing the updated listing to a corresponding visible view in the end point;

capturing changes in the model for the common session; and seamlessly applying the changes to user interface portions of the view of the visual channel of access.

9. The computer program product of claim 8, wherein the computer usable program code for establishing multiple channels of access to a common session for a composite service, comprises computer usable program code for establishing for a common session in a next generation networking (NGN) network at least a voice channel of access to the common session, and a visual channel of access to the common session.

10. The computer program product of claim 8, wherein the computer usable program code for synchronizing changes of state for a model for the common session in the views for the channels of access to the composite service, comprises:

computer usable program code for maintaining the state for the model for the common session;

computer usable program code for creating listeners for changes of the state for the model;

computer usable program code for detecting changes in the state for the model in the listeners; and, computer usable program code for updating the views for the channels of access to the common session responsive to detecting the changes of state for the model in the listeners.

* * * * *